(12) United States Patent
Myers et al.

(10) Patent No.: US 11,041,539 B1
(45) Date of Patent: Jun. 22, 2021

(54) BI-DIRECTIONAL DAMPING SYSTEM

(71) Applicant: United States of America as represented by the Administrator of NASA, Washington, DC (US)

(72) Inventors: W. Neill Myers, Huntsville, AL (US); Robert E. Berry, Madison, AL (US); Frederick Scott Gant, Huntsville, AL (US); Jeffrey Lee Lindner, Madison, AL (US); John S. Townsend, Union Grove, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/948,884

(22) Filed: Oct. 5, 2020

(51) Int. Cl.
*F16F 9/36* (2006.01)
*F16F 15/023* (2006.01)
*F16F 9/04* (2006.01)

(52) U.S. Cl.
CPC .......... *F16F 15/0232* (2013.01); *F16F 9/049* (2013.01); *F16F 9/0418* (2013.01); *F16F 2222/126* (2013.01); *F16F 2230/32* (2013.01); *F16F 2232/08* (2013.01); *F16F 2234/02* (2013.01)

(58) Field of Classification Search
CPC ...... F16F 15/0232; F16F 9/0418; F16F 9/049; F16F 2222/126; F16F 2230/32; F16F 2232/08; F16F 2234/02
See application file for complete search history.

(56) References Cited

U.S. PATENT DOCUMENTS

| | | | | |
|---|---|---|---|---|
| 2,773,686 A | * | 12/1956 | Nash | F16F 9/049 267/64.23 |
| 3,212,769 A | * | 10/1965 | Ishibashi | F16F 9/0472 267/64.23 |
| 4,760,996 A | | 8/1988 | Davis | |
| 4,930,336 A | * | 6/1990 | Smedberg | B21D 24/02 267/119 |
| 5,332,070 A | | 7/1994 | Davis et al. | |
| 6,691,989 B1 | * | 2/2004 | Leonard | B60G 17/0521 267/118 |
| 7,182,188 B2 | | 2/2007 | Ruebsamen et al. | |
| 9,254,727 B2 | * | 2/2016 | Moulik | F16F 9/049 |
| 9,259,985 B2 | * | 2/2016 | Leonard | F16F 9/0409 |
| 9,587,702 B2 | | 3/2017 | Witwer et al. | |
| 10,449,819 B2 | * | 10/2019 | Delorenzis | B60G 11/27 |
| 2005/0217954 A1 | | 10/2005 | Hindle et al. | |

(Continued)

*Primary Examiner* — Xuan Lan Nguyen
(74) *Attorney, Agent, or Firm* — James J. McGroary; Helen M. Gaius

(57) ABSTRACT

A bi-directional damping system generates damping forces in two opposing directions. A shaft has a plurality of bi-directional damping modules fixedly coupled thereto. Each module includes a fluid-filled variable-volume first chamber including at least one port through which fluid can flow based on changes in volume of the first chamber, and a fluid-filled variable-volume second chamber including at least one port through which fluid can flow based on changes in volume of the second chamber. The first chamber and second chamber are fluidically isolated from one another. A fluid-filled spacer chamber is coupled to adjacent ones of the modules. The spacer chamber includes at least one venting port through which fluid can flow based on pressure in the spacer chamber.

5 Claims, 2 Drawing Sheets

(56) References Cited

U.S. PATENT DOCUMENTS

Figure 1:
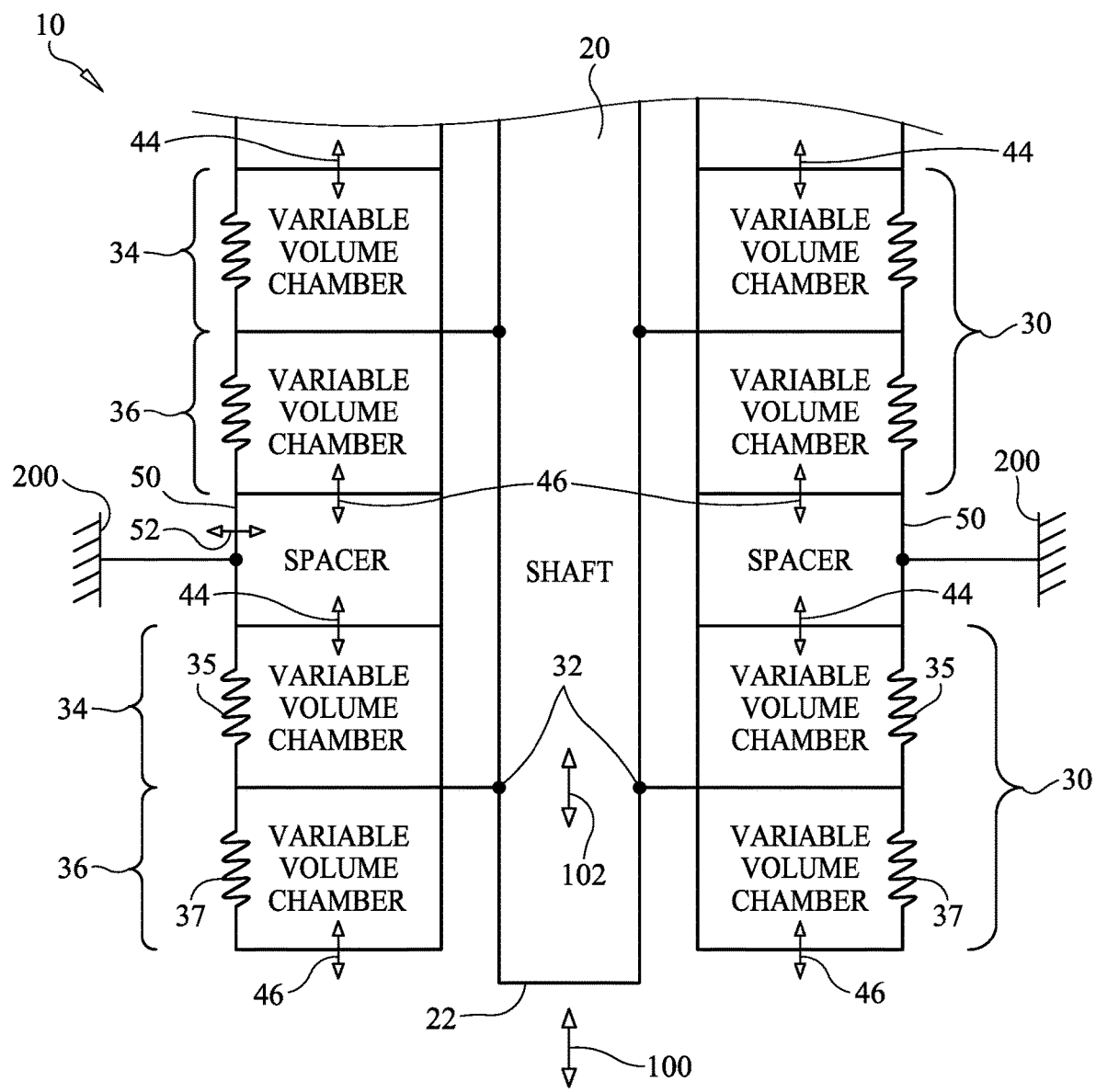

2012/0267506 A1* 10/2012 Hadden .................. F16F 15/06
                                                                             248/636
2015/0226282 A1* 8/2015 Hindle .................... F16F 9/18
                                                                             188/297

* cited by examiner

BI-DIRECTIONAL DAMPING SYSTEM

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore.

BACKGROUND OF THE INVENTION

1. Field of the Invention

This invention relates to damping systems. More specifically, the invention is a damping system providing damping forces in each of two opposing linear directions.

2. Description of the Related Art

A variety of structures or mechanisms are susceptible to dynamic or cyclic deflection and/or vibratory behavior that can produce undesirable results. While conventional springs and dampers can be used to control vibrations in some applications, they generally do not have the ability to generate damping forces in two opposing linear directions and/or generally are not easily modified to adapt to changing vibration amplitude.

SUMMARY OF THE INVENTION

Accordingly, it is an object of the present invention to provide a bi-directional damping system.

Another object of the present invention is to provide a damping system that can be configured to provide adjustable amounts of damping forces in each of two opposing directions.

Other objects and advantages of the present invention will become more obvious hereinafter in the specification and drawings.

In accordance with the present invention, a bi-directional damping system for generating damping forces in two opposing directions includes a shaft and a plurality of bi-directional damping modules. Each module is fixedly coupled to the shaft at a unique longitudinal location thereof. Each module includes a fluid-filled variable-volume first chamber including at least one port through which fluid can flow based on changes in volume of the first chamber, and a fluid-filled variable-volume second chamber including at least one port through which fluid can flow based on changes in volume of the second chamber. The first chamber and second chamber are fluidically isolated from one another. A fluid-filled spacer chamber is coupled to adjacent ones of the modules and is uncoupled from the shaft. The spacer chamber includes at least one venting port through which fluid can flow based on pressure in the spacer chamber.

BRIEF DESCRIPTION OF THE DRAWING(S)

Figure 2:
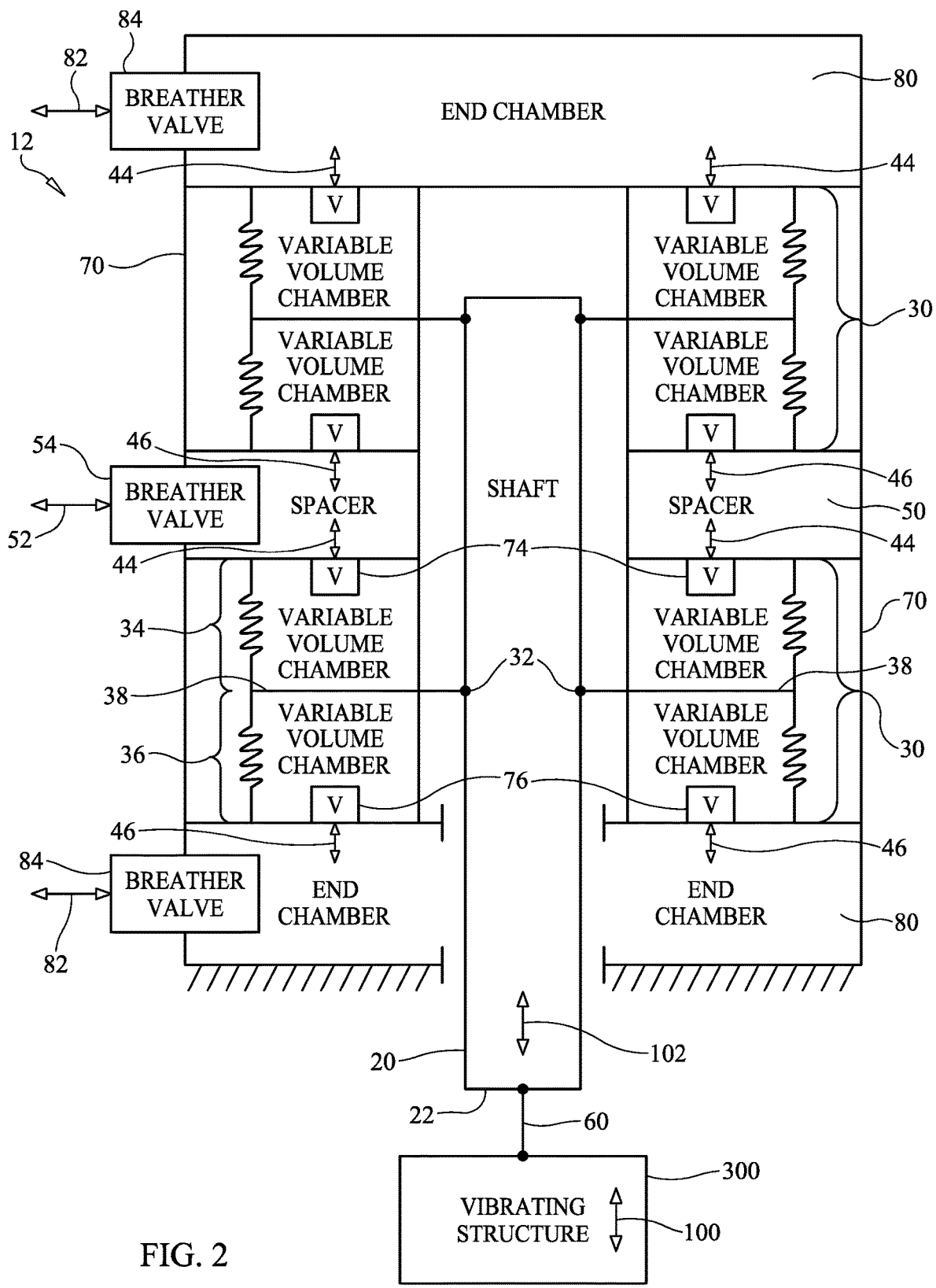

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of a bi-directional damping system in accordance with an embodiment of the present invention; and FIG. 2 is a schematic view of a self-contained, bi-directional damping system in accordance with another embodiment of the present invention.

DESCRIPTION OF THE PREFERRED EMBODIMENT(S)

Referring now to the drawings and more particularly to FIG. 1, a bi-directional damping system in accordance with the present invention is shown schematically and is referenced generally by numeral 10. As will be explained further below, damping system 10 can generate damping forces in each of two opposing directions to counteract cyclic or vibrating motion of a structure or mechanism (not shown) where such vibratory motion is indicated in FIG. 1 by a two-headed arrow 100. The type and/or size of the vibrating structure/mechanism are not limitations of the present invention.

Damping system 10 includes a shaft 20 that, in general, is coupled to the structure/mechanism that is subject vibratory motion 100. For example, one end 22 of shaft 20 can be directly coupled to the vibrating structure/mechanism or indirectly coupled to the structure/mechanism through a linkage (not shown). Such coupling transfers vibratory motion 100 to shaft 20 to produce corresponding vibratory motion 102 of shaft 20 along the longitudinal length of shaft 20. Shaft 20 is axially rigid and can be a one-piece or multiple-piece structure without departing from the scope of the present invention.

Shaft 20 extends substantially along the length of damping system 10 to deliver corresponding vibrating motion 102 to each of multiple damping modules 30 distributed along the length of shaft 20. In the illustrated embodiment, two-damping modules 30 are shown. However, it is to be understood that additional modules 30 can be provided along the length of shaft 20 without departing from the scope of the present invention. The ability to add more damping modules 30, as well as segments of shaft 20 as needed, allows damping system 10 to be configured and adapted to a variety of applications requiring different amounts of damping forces.

Each of damping modules 30 is fixedly and rigidly coupled to shaft 20 at a unique location along the length thereof as indicated at 32 such that vibrating motion 102 is transferred to each of damping modules 30. In the illustrated embodiment, each of modules 30 is disposed annularly about shaft 20 such that shaft 20 is centrally disposed in each module 30. Each of damping modules 30 has two variable-volume chambers 34 and 36 associated therewith. Both chambers 34 and 36 are filled with a fluid (e.g., a gas or, in some cases, a liquid). Chambers 34 and 36 are fluidically isolated from one another. The chambers' variable volume capability can be achieved in a variety of ways without departing from the scope of the present invention. By way of a non-limiting example, side walls 35 and 37 each of chambers 34 and 36, respectively, can be constructed for flexibility using bellows, rolling diaphragms, etc.

During each phase of shaft 20's vibratory motion 102, one of chambers 34 and 36 experiences compression (i.e., a reduction in volume), while the other experiences extension (i.e., an increase in volume). During a chamber's compression, fluid in the chamber is pushed therefrom. During a chamber's extension, additional fluid is pulled into the chamber. Such fluid movement into or out of chamber 34 is indicated by two-headed arrow 44, and such fluid movement into or out of chamber 36 is indicated by two-headed arrow 46. Fluid movements 44 and 46 can be controlled using one or more valves (e.g., multiple one-way valves, a single two-way variable-aperture valve as disclosed in U.S. Pat. No. 8,939,178, etc.), the choice of which is not a limitation of the present invention. Regardless of the type(s) of valves used, fluid movements 44 and 46 experience resistance as they occur.

Adjacent damping modules 30 are separated and coupled to one another by a fixed-volume spacer chamber 50 that is coupled to a support structure 200, but uncoupled from shaft 20 such that shaft 20 can experience vibratory motion 102 relative to spacer chamber 50. Spacer chamber 50 is filled with the same fluid used to fill chambers 34 and 36, and serves as a fluid reservoir for receiving and supplying the fluid to chambers 34 and 36 when experiencing compression and extension, respectively. To prevent fluid movements 44 and 46 from being dead-headed by pressure build-up or pressure drops in spacer chamber 50, the chamber can be vented as indicated by two-headed arrow 52 where such venting can be regulated by, for example, breather valve(s) (not shown).

In operation, vibratory motion 102 of shaft 20 translates into the above-described compression/extension of chambers 34 and 36 and corresponding fluid movements 44 and 46. The resistance encountered by fluid movements 44 and 46 lags (i.e., a phase lag) behind the vibratory motion 100 that is to be damped. Damping system 10 can be tuned to an optimum phase lag for a given application to reduce the gain of resonance. Such tuning can be readily achieved by the choice of and/or adjustment of the valves controlling fluid movements 44 and 46.

Referring now to FIG. 2, a self-contained bi-directional damping system in accordance with another embodiment of the present invention is shown and is referenced generally by numeral 12. Damping system 12 is coupled to a vibrating structure 300 subject to the above-described vibratory motion 100. More specifically, one end 22 of shaft 20 is coupled to structure 300 by a linkage 60 such that vibratory motion 100 is translated to shaft 20 as vibratory motion 102 as described above. Damping system 12 includes a rigid housing 70 that allows shaft 20 to extend therefrom and vibrate in motion 102. Each damping module 30 includes a rigid plate 38 that is fixed to shaft 20 at 32 such that each plate 38 experiences vibratory motion 102 along with shaft 20. Spacer chamber 50 can be attached to housing 70 or integrated therewith (as shown) without departing from the scope of the present invention. The above-described fluid movements 44 and 46 are controlled by one or more valves ("V") 74 and 76, respectively. The above-described venting 52 of spacer chamber 50 can be supported by a breather valve 54 that can communicate with an ambient environment when the fluid used in damping modules 30 and spacer chamber 50 is air.

Housing 70 can also be configured to provide end chambers 80 at opposing ends of damping system 12. Each end chamber 80 functions similarly to spacer chamber 50 and, therefore, is equipped with a breather valve 84 to facilitate venting 82 based on pressure in chamber 80.

The advantages of the present invention are numerous. Vibration motion in each of two opposing directions is damped by a system that is readily adapted and tuned by adding damping modules and/or adjusting the fluid movement resistance of the damping modules. Thus, the damping system has an adjustable dynamic range that enhances its functionality and value.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A bi-directional damping system for generating damping forces in two opposing directions, comprising:
    a rigid housing;
    a shaft disposed in said housing and extending on one end thereof from said housing, said one end adapted to be coupled to a structure subject to vibration;
    a serial arrangement of bi-directional damping modules disposed in said housing, each of said modules fixedly coupled to said shaft at a unique longitudinal location thereof, each of said modules including
    a rigid plate fixed to said shaft at said unique longitudinal location associated with one of said modules,
    a fluid-filled variable-volume first chamber coupled to a first face of said plate, said first chamber including at least one first valve through which fluid flows based on changes in volume of said first chamber, and
    a fluid-filled variable-volume second chamber coupled to a second face of said plate, said second chamber including at least one second valve through which fluid flows based on changes in volume of said second chamber, wherein said first chamber and said second chamber are fluidically isolated from one another by said plate;
    said housing defining a fixed-volume reservoir between adjacent ones of said modules and at opposing ends of said serial arrangement wherein, for each of said modules, a first said reservoir is in fluid communication with said first chamber via said at least one first valve thereof and a second said reservoir is in fluid communication with said second chamber via said at least one second valve thereof; and
    a breather valve disposed in said housing at each said reservoir, each said breather valve adapted to provide fluid communication with an ambient environment.

2. A system as in claim 1, wherein said shaft is centrally disposed in each of said modules.

3. A system as in claim 1, wherein each of said modules and each said spacing chamber is disposed annularly about said shaft.

4. A system as in claim 1, wherein each said first chamber and each said second chamber include flexible side walls.

5. A system as in claim 1, wherein a fluid filling said first chamber and said second chamber comprises a gas.

* * * * *